United States Patent [19]

Suzuki et al.

[11] Patent Number: 5,617,381
[45] Date of Patent: Apr. 1, 1997

[54] REPRODUCING SYSTEM FOR AUTOMATICALLY REPRODUCING OPTICAL DISCS

[75] Inventors: Shinichi Suzuki; Yoshiya Nonaka; Kenichi Takahashi, all of Saitama-ken, Japan

[73] Assignee: Pioneer Electronic Corporation, Tokyo, Japan

[21] Appl. No.: 374,172

[22] Filed: Jan. 18, 1995

[30] Foreign Application Priority Data

Jan. 20, 1994 [JP] Japan ................................. 6-004586

[51] Int. Cl.$^6$ ................................................. G11B 17/22
[52] U.S. Cl. .................................. 369/32; 369/33; 369/34
[58] Field of Search .................................. 369/32, 33, 34, 369/60

[56] References Cited

U.S. PATENT DOCUMENTS 5,195,066  3/1993  Amemiya et al. ...................... 369/34
5,410,525  4/1995  Yokota ................................... 369/32
5,463,605  10/1995 Nishida et al. ......................... 369/34

*Primary Examiner*—David C. Nelms
*Assistant Examiner*—Huan Hoang
*Attorney, Agent, or Firm*—Nikaido, Marmelstein, Murray & Oram LLP

[57] ABSTRACT

A pickup is provided for reading the program data and identification data on a disc. A memory is provided for storing data read out by the pickup. A control unit operates to control the reading of data. The control is performed in such a manner as to intermittently read the program data of a first disc, to intermittently store the read out data in the memory means, to read identification data of a second disc during a period between the reading of the first disc, to continuously reproduce the stored program data.

3 Claims, 6 Drawing Sheets

REPRODUCING SYSTEM FOR AUTOMATICALLY REPRODUCING OPTICAL DISCS

BACKGROUND OF THE INVENTION

The present invention relates to a system for automatically reproducing a plurality of optical discs such as CDs (compact discs).

FIG. 5 schematically shows a conventional CD player. A CD player 1 comprises a magazine 2 in which a plurality of CDs are stored, and a disc selecting member 3.

When the reproduction of the discs is started, the disc selecting member 3 pushes out an uppermost disc a small distance. The pushed-out disc is detected by a sensor 4 and returned into the magazine. Similarly, other discs are sequentially detected in order so as to detect the existence of the disc.

Thereafter, the discs are loaded in a playback device in order, where a TOC (table of content) of each disc is read out and stored in a memory (RAM). After the storage of TOCs of all discs, the reproduction of the discs is started from the uppermost disc.

FIG. 6 shows the above described reproduction method.

In another reproduction method, after the uppermost disc is detected, the disc is loaded in the playback device, and the TOC is read out and the disc is reproduced. When the uppermost disc is returned to the magazine, the next discs are sequentially reproduced in the same manner as the uppermost disc.

In the former method, it takes a long time before the reproduction of the disc. In the latter method, there is a long time between the reproductions. In any method, there is a long time during which no sound is produced.

SUMMARY OF THE INVENTION

Therefore, an object of the present invention is to provide a system which may reproduce a plurality of optical discs without a no-sound period except for a necessary minimum no-sound period for exchanging the discs.

According to the present invention, there is provided a system for reproducing a plurality of discs comprising storage means storing a plurality of discs on each of which program data and identification data are recorded, selecting means for selecting one of the discs, reading means for reading the program data and the identification data on a selected first disc, memory means for storing data read out by the reading means, control means for controlling the reading of the data.

The control means is provided to control the operation so as to read the program data of the first disc, to store the read out data in the memory means up to a predetermined quantity, to stop the reading, to change the selected disc with a second disc, to read the identification data of the second disc to store the read out identification data in the memory means during an allowable period, to change the second disc with the first disc, to repeat these operations, and to continuously reproduce the program data stored in the memory means.

The other objects and features of this invention will become understood from the following description with reference to the accompanying drawings.

DETAILED DESCRIPTION OF THE PREFERRED EMBODIMENTS

Figure 1:
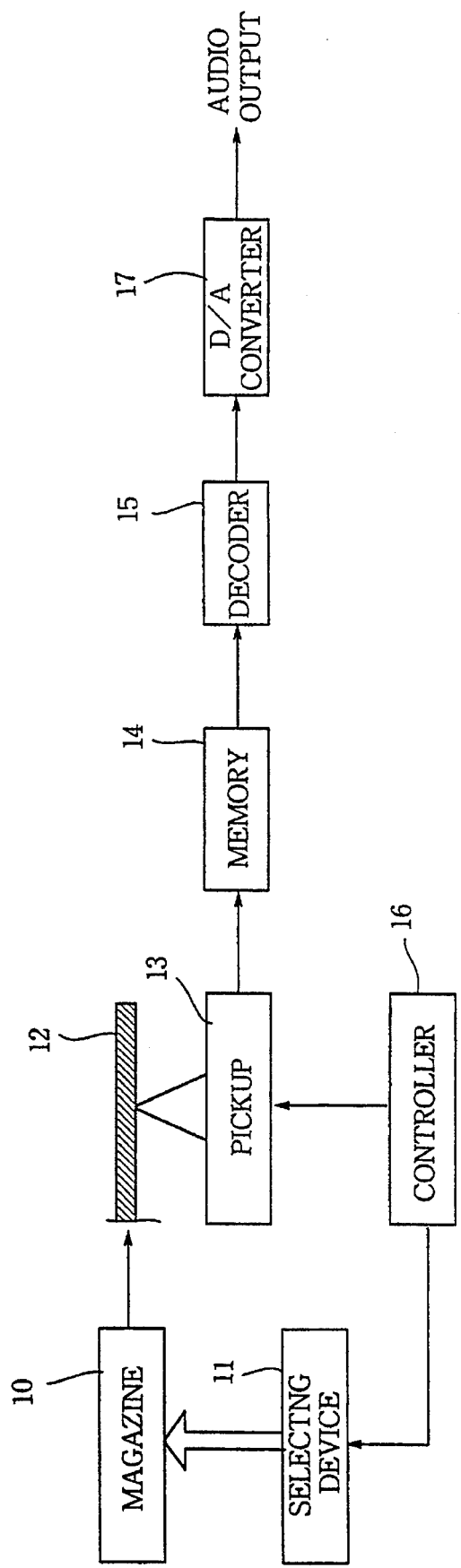
FIG. 1 is a block diagram showing a reproducing system of the present invention.

Referring to FIG. 1 showing a block diagram of a system according to the present invention, the system is provided for reproducing Minidiscs (MDs) of SONY. In the MD, data are compressed by the audio compression technique called ATRAC (Adaptive Transform Acoustic Coding).

The system of the present invention comprises a magazine 10 in which a plurality of MDs are stored, a selecting device 11 for selecting one of the MDs in the magazine 10. A first disc 12 is selected and loaded on a reproducing device by the selecting device 11 and data recorded thereon are read out by a pickup 13. The data include program data such as music data and identification data such as TOC.

After reading the TOC, the music data are read out. Read out data are successively stored in a memory 14, and the stored data are continuously discharged from the memory to a decoder 15. The compressed data are decoded by the decoder 15 and applied to a D/A converter 17. Converted analogue signals are applied to an audio amplifier (not shown) as an audio output. A controller 16 controls operations of the selecting device 11 and the pickup 13.

When the memory 14 is filled with the music data, the reading of the data is stopped and the pickup is paused. The first disc 12 is unloaded and returned to the magazine 10, and a next second disc is loaded by the selecting device 11. During the exchange of the first and second discs, music data in the memory 14 are continuously discharged without pausing in order to continue the reproduction of the audio output. The TOC of the second disc is read out by the pickup 13 and stored in the memory at a specific area.

On the other hand, the quantity of data stored in the memory 14 reduces as the reproduction continues. When the quantity reaches a lower limit quantity, the reading of the TOC of the second disc is stopped, and the second disc is exchanged with the first disc. Thus, the next music data on the first disc are successively read out and stored in the memory 14. It will be understood that the second disc may be stored in an exclusive memory.

Figure 2:
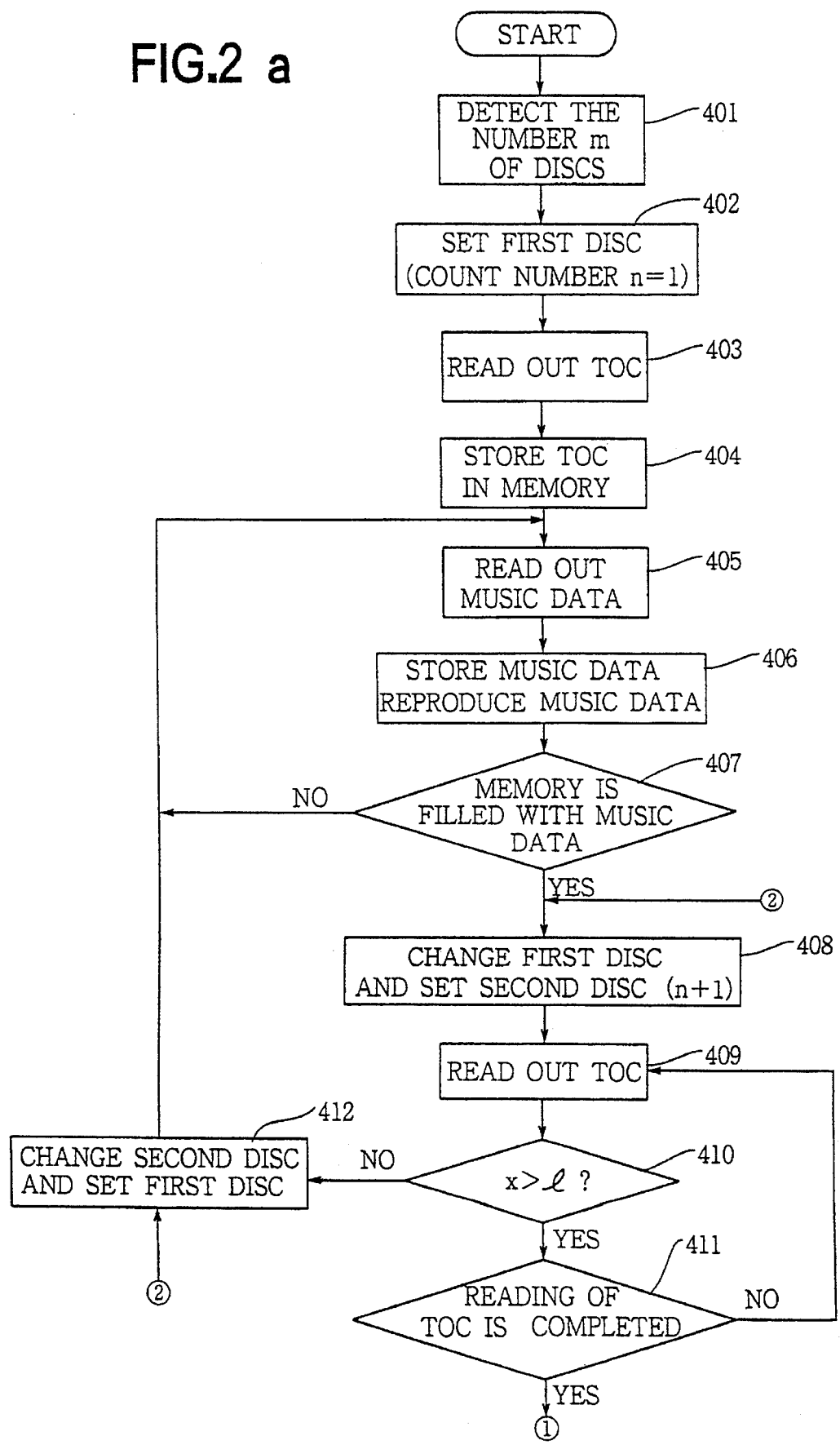
FIGS. 2a and 2b are flowcharts showing an operation of the system.
Figure 2:
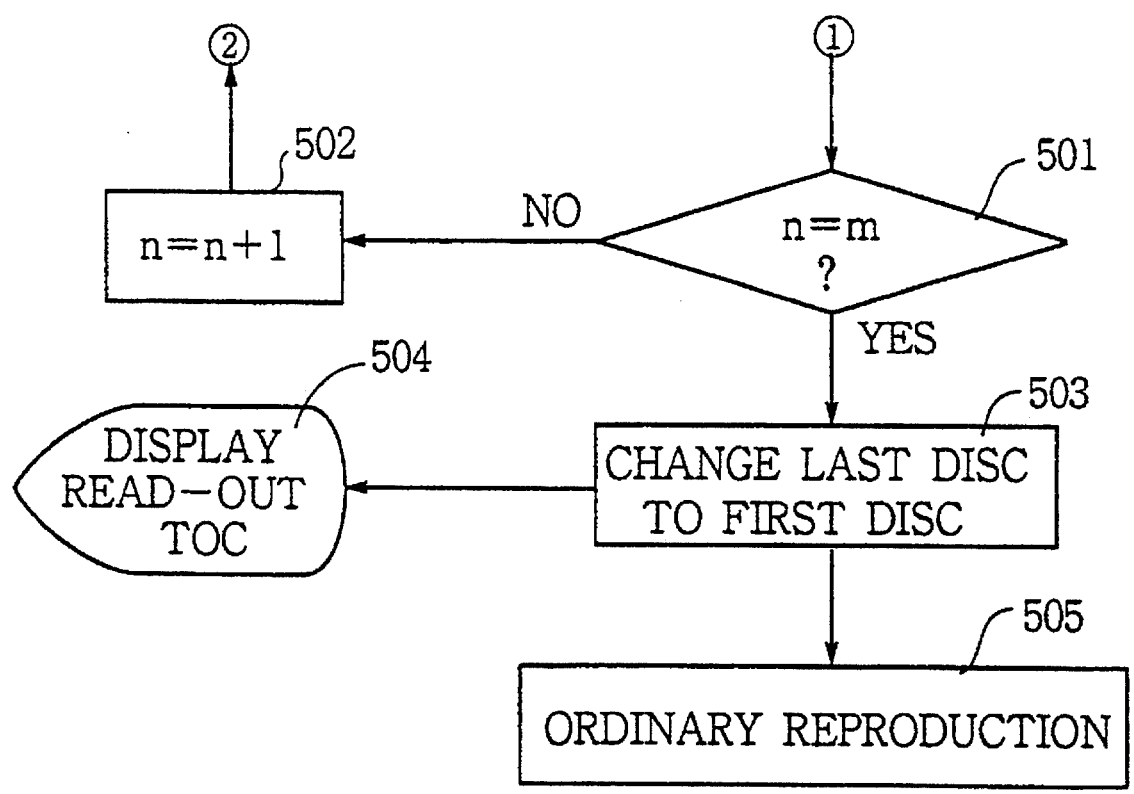

The operation of the system will be described hereinafter with reference to FIGS. 2a and 2b showing flowcharts of the operation. At a step 401, the number m of discs stored in the magazine 10 is detected. The detection is performed by switches provided in the magazine 10. At a step 402, a first disc (count number n=1) is set and the TOC thereof is read out (step 403) and stored in the memory 14 (step 404). Furthermore, music data are read out (step 405) and stored in the memory 14 in sequence. The stored music data are continuously reproduced at a step 406. At a step 407, it is determined whether the memory 14 is filled with the music data. If not, the program returns to the step 405. When the memory is fully charged, the program proceeds to a step 408 where the first disc is returned to the magazine and a second disc (n+1) is set. Subsequently, the TOC of the second disc is read out (step 409). During the reading of the TOC, the remaining music data in the memory 14 is detected.

Here, the time for reproducing the remaining music data is assumed as x, and a limit time necessary for exchanging the discs and necessary for re-starting the reading of the music data on the first disc is assumed as l. At a step 410, it is determined whether the time x is larger than the limit time l (x>l).

When x>l, the program proceeds to a step 411 where it is determined whether the reading of the TOC is completed. If not, the program returns to the step 409 so that the TOC reading is repeated. If x<l, the program goes to a step 412 from the step 410. At the step 412, the second disc is returned to the magazine, and the first disc is set. Thus, the program is returned to the step 405. When the reading of the TOC is completed at the step 411, the program proceeds to a step 501 of FIG. 2b. At the step 501, it is determined whether the count number n of discs reaches the number of discs m stored in the magazine. In other words, the fact that TOCs of all discs have been read out is determined. If not, one is added to the number n at a step 502. When the reading of the TOCs of all discs is completed, the last disc is exchanged to the first disc (step 503), and the ordinary reproduction, namely direct reproduction from the first disc is performed at a step 505. On the other hand, the read-out TOC is displayed at a step 504.

Figure 3:
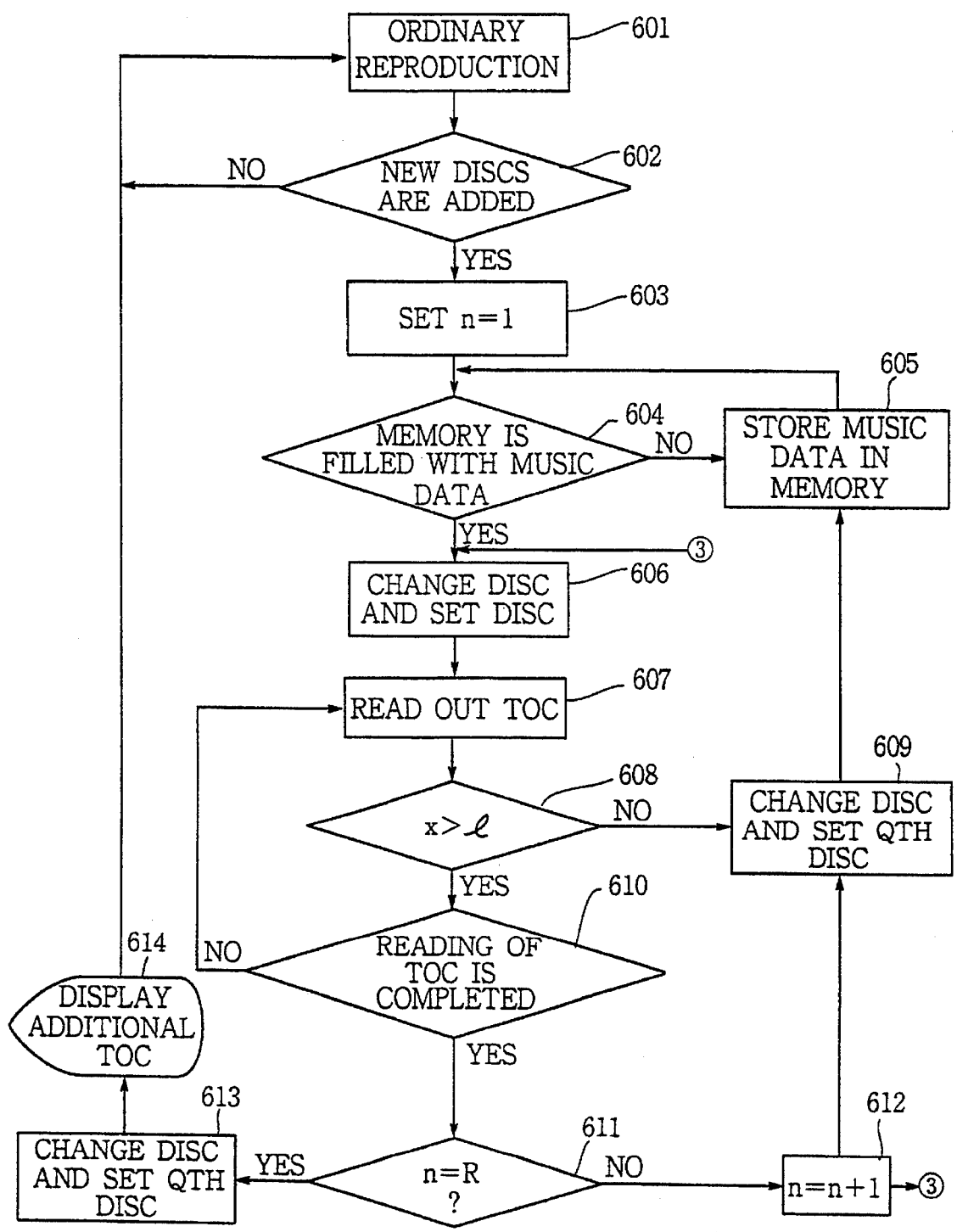
FIG. 3 is a flowchart showing an operation of the system when new discs are added.

FIG. 3 shows the flowchart showing the operation when new discs are added to the disc stored in the magazine during the reproduction of the old discs. When new discs are added, the count number n is set to 1 (steps 601–603). When the memory 14 is filled with the read-out music data, the TOC of the newly added disc is read out (steps 604, 606, 607). Here, it is assumed that the number of newly added disc is R, and the music data of Qth disc is reproduced. When x<l, the Qth disc is set (step 609). If x>l, the reading of the TOC of the Pth disc is continued (steps 610, 607). When the TOCs of all the discs are read out, the Qth disc is set (step 613).

FIGS. 4a to 4e are time charts showing TOC reading operations of the conventional method and the present invention. In the conventional method, when the reading of the TOC of the first disc finishes, the disc is changed to the second disc. Thus, TOCs of discs are continuously read out in order. In the time chart, TR is TOC reading time, and TC is time for the disc exchange.

Figure 4:
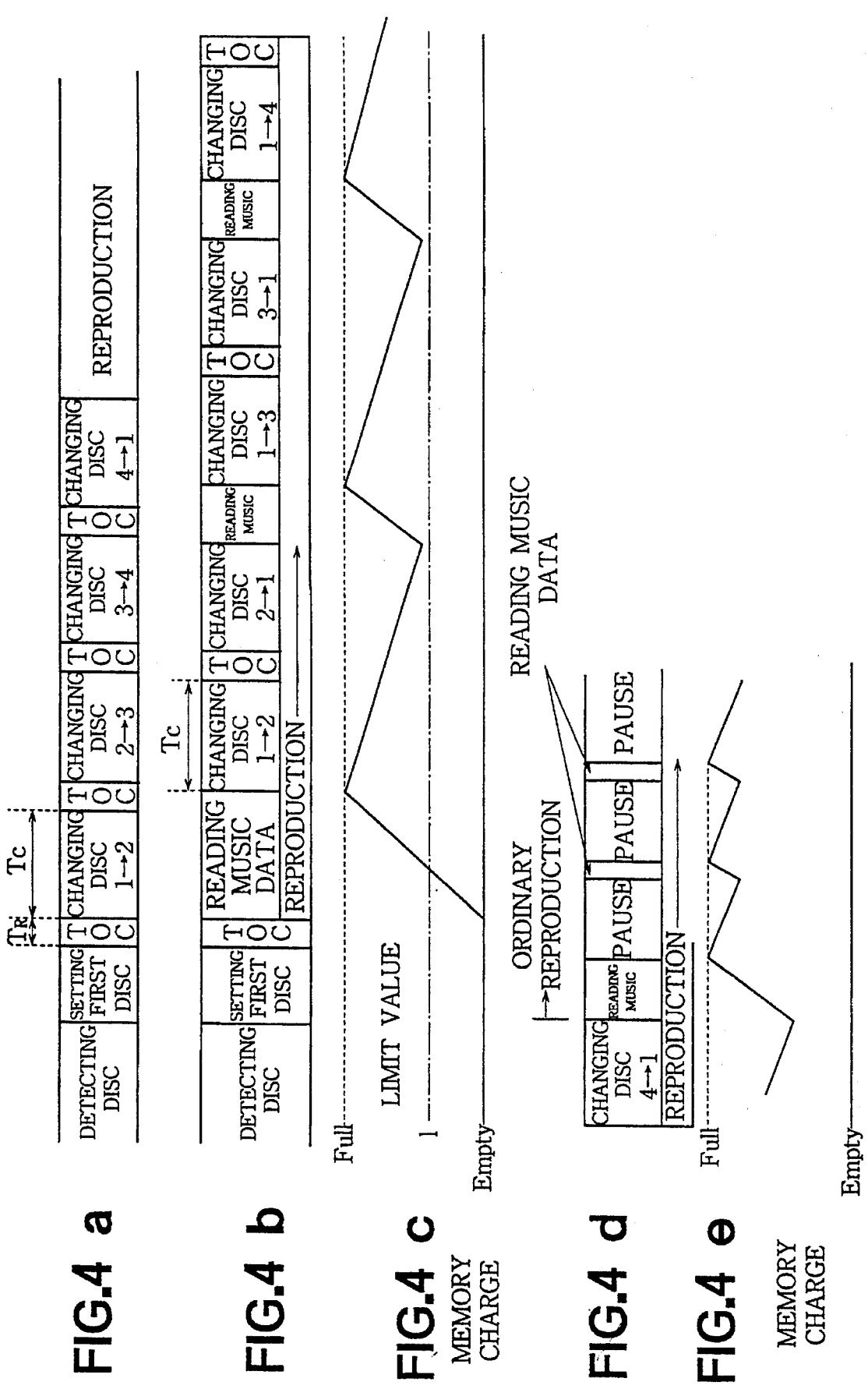
FIGS. 4a, 4b, 4c, 4d and 4e are time charts showing reading operations of TOC of a conventional method and the present invention.
Figure 5:
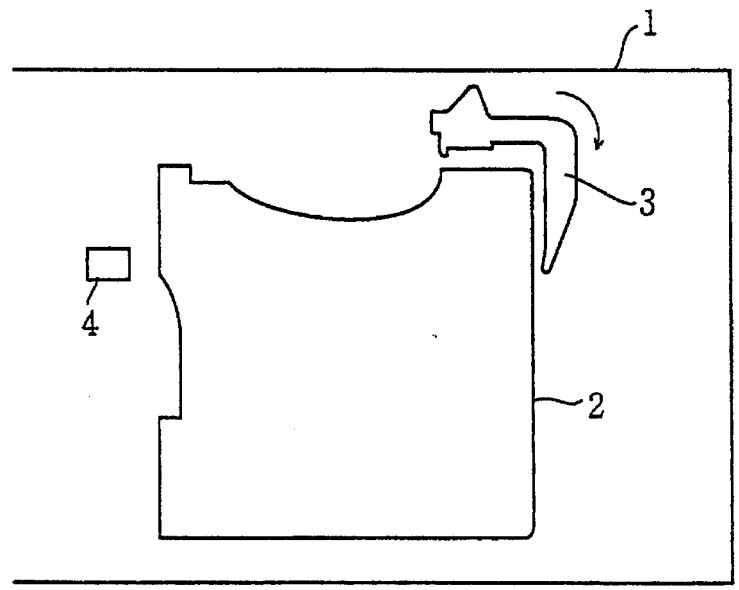
FIG. 5 is a schematic plan view showing a conventional CD player.
Figure 6:
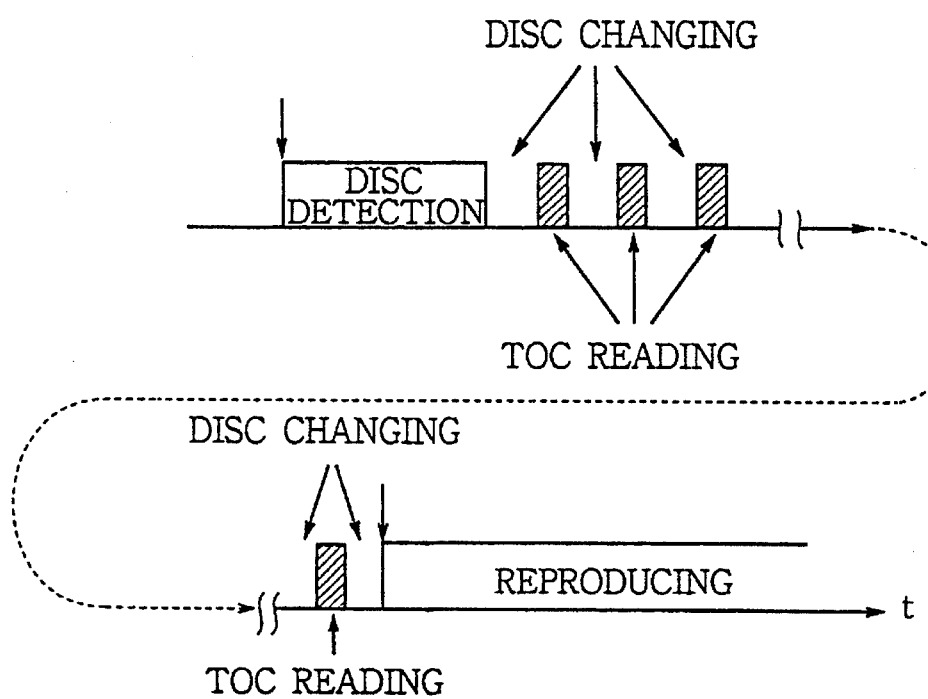
FIG. 6 is a diagram showing a reproduction method of the conventional CD player.

In the present invention of FIGS. 4b and 4d, when the reading of the TOC of the first disc finishes, the music data thereof are read out and stored in the memory, and the data stored in the memory are reproduced. As shown in FIGS. 4c and 4e, when the memory is fully charged, discs are exchanged, and the TOC of the second disc is read out. When the content of the memory reaches a limit value, the reading of the music data are re-started. Thereafter, the same operation is repeated. When the reading of TOCs of all discs finishes, the ordinary reproduction of the first disc is started.

The present invention may be applied to reproduce CDs. In such a case, it is necessary to provide a system for more quickly reading data than the rated reading speed.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. A system for reproducing a plurality of discs comprising:

storage means storing a plurality of discs on each of which program data and identification data are recorded;

selecting means for selecting one of the discs;

reading means for reading the program data and the identification data on a selected first disc;

memory means for storing data read out by the reading means;

control means for controlling the reading of the data so as to intermittently read the program data of the first disc, to intermittently store the read out data in the memory means, to read identification data of another disc during a period between a temporary stop of reading of the first disc and a restart of reading the first disc, in order to continuously reproduce the stored program data.

2. The system according to claim 1 wherein the control means further is provided for controlling the reading of the data so as to store the read out program data of the first disc up to a predetermined quantity of the memory means, to stop the reading, to change the first disc with the other disc, to read the identification data of the other disc, to store the read out identification data in the memory means during an allowable period, to change the other disc with the first disc, and to repeat these operations.

3. The system according to claim 1 wherein the program data and identification data are compressed.

* * * * *